(12) United States Patent
Sen (10) Patent No.: US 10,545,557 B2
(45) Date of Patent: Jan. 28, 2020

(54) METHODS, SYSTEMS, AND DEVICES FOR MOBILE DEVICE POWER MANAGEMENT

(71) Applicant: Citrix Systems, Inc., Fort Lauderdale, FL (US)

(72) Inventor: Sumit Sen, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 867 days.

(21) Appl. No.: 14/586,454

(22) Filed: Dec. 30, 2014

(65) Prior Publication Data

US 2016/0187949 A1 Jun. 30, 2016

(51) Int. Cl.
*G06F 1/32* (2019.01)
*G06F 1/3212* (2019.01)

(52) U.S. Cl.
CPC .......... *G06F 1/3212* (2013.01); *Y02D 10/153* (2018.01); *Y02D 10/174* (2018.01); *Y02D 70/00* (2018.01)

(58) Field of Classification Search
CPC .............. G06F 1/3212; H04W 52/028; H04W 52/0277
See application file for complete search history.

(56) References Cited

U.S. PATENT DOCUMENTS

| | | | | |
|---|---|---|---|---|
| 6,760,587 B2* | 7/2004 | Holtzman | ............ | H04W 52/223 370/331 |
| 6,781,972 B1* | 8/2004 | Anderlind | ............... | H04L 51/12 370/329 |
| 6,898,438 B1 | 5/2005 | Uchida | | |
| 8,583,953 B2* | 11/2013 | Sultenfuss | ............ | G06F 1/3203 713/320 |
| 8,811,208 B2* | 8/2014 | Johnsson | ................ | H04L 12/10 370/252 |

(Continued)

FOREIGN PATENT DOCUMENTS

| EP | 1679914 A1 | 7/2006 |
|---|---|---|
| EP | 2200371 A2 | 6/2010 |

OTHER PUBLICATIONS

Partial International Search Report and Invitation for PCT Application No. PCT/US2014/072858; dated Sep. 1, 2015; 7 pages.

*Primary Examiner* — Jaweed A Abbaszadeh
*Assistant Examiner* — Cheryl L Harrington
(74) *Attorney, Agent, or Firm* — Foley & Lardner LLP; Christopher J. McKenna (57) ABSTRACT

This disclosure relates generally to mobile device power management, and more particularly to methods and systems for mobile device power management. In one embodiment, a mobile computing device is described, that may include a processor, and a non-transitory computer-readable memory, including instructions that, when executed, can cause the processor to determine a power level comprising power level information indicative of a battery power level of the mobile computing device, select a power profile from a plurality of power profiles, based on a data transmission type, transmit power profile information representing the selected power profile to an operatively connected second computing device, where the power profile information can be used by the second computing device to configure the data transmission type, and receive data according to the data transmission type.

45 Claims, 6 Drawing Sheets

(56) References Cited

U.S. PATENT DOCUMENTS

| | | | | |
|---|---|---|---|---|
| 2004/0180701 A1* | 9/2004 | Livet | H04W 52/0261 | 455/574 |
| 2004/0204181 A1* | 10/2004 | Cromer | H04W 52/0277 | 455/574 |
| 2005/0094665 A1* | 5/2005 | Nalawadi | H04L 41/0896 | 370/468 |
| 2005/0114721 A1* | 5/2005 | Azadet | H04W 52/0277 | 713/320 |
| 2005/0120250 A1* | 6/2005 | Adachi | G06F 1/26 | 713/300 |
| 2005/0201291 A1* | 9/2005 | Gluck | G06F 1/3278 | 370/241 |
| 2007/0004376 A1* | 1/2007 | Kogure | H04W 28/22 | 455/343.5 |
| 2007/0004466 A1* | 1/2007 | Haartsen | H04W 52/0261 | 455/572 |
| 2007/0224951 A1* | 9/2007 | Gilb | H01Q 3/26 | 455/127.5 |
| 2009/0061954 A1* | 3/2009 | Syed | H04W 52/0225 | 455/574 |
| 2009/0325622 A1 | 12/2009 | Matsumura et al. | | |
| 2010/0153760 A1* | 6/2010 | Gupta | G06F 13/102 | 713/323 |
| 2010/0184405 A1* | 7/2010 | Chen | H04M 1/66 | 455/410 |
| 2010/0313050 A1* | 12/2010 | Harrat | G06F 1/3203 | 713/323 |
| 2011/0013723 A1* | 1/2011 | Suga | H04L 1/0002 | 375/295 |
| 2011/0136530 A1* | 6/2011 | Deshpande | H04W 24/10 | 455/515 |
| 2013/0288651 A1* | 10/2013 | Chen | H04M 1/66 | 455/414.1 |
| 2015/0056947 A1* | 2/2015 | Panchal | H04W 52/0251 | 455/405 |
| 2016/0094984 A1* | 3/2016 | Singer | H04W 4/02 | 455/418 |
| 2016/0147292 A1* | 5/2016 | Sunwoo | G06F 1/1647 | 713/323 |
| 2016/0179649 A1* | 6/2016 | Bank | G06F 21/55 | 713/340 |

\* cited by examiner

| | Percentage of Remaining Battery Power | | Screen refresh rate (% of normal) |
|---|---|---|---|
| Hours | Un-optimized Example | Optimized Example | |
| 0 | 100% | 100% | 100% |
| 1 | 75% | 75% | 80% |
| 2 | 50% | (75%-80%x25%) = 55% | 70% |
| 3 | 25% | (55-70%x25%) = 37.5% | 60% |
| 4 | 0% | (37.5-60%x25%) = 22.5% | |

METHODS, SYSTEMS, AND DEVICES FOR MOBILE DEVICE POWER MANAGEMENT

BACKGROUND

Mobile devices frequently send and receive data transmissions through wireless networks. Mobile devices tend to consume battery reserves at an increased rate with wireless communication enabled (for example, cellular, Bluetooth, and/or WiFi). Some mobile device manufacturers recommend disabling wireless communication on the device to conserve battery life when wireless communication is unneeded, because the power consumed on a mobile device may increase several-fold when the wireless communication is in use, versus a much lower consumption rate when the device is not actively transmitting and/or receiving data. Similarly, when a device has the Wi-Fi communication enabled, but is in a suspended state (that is, not sending and/or receiving data), the device may draw hundreds of times less current than an active transmission/reception phase.

Although device-level applications exist for extending the battery life of a mobile device, they may not communicate with transmitting server to agree on a transmission rate that varies with respect to the remaining battery level on the client mobile device. Particularly, in a client-server scenario, the server side is typically unaware of the remaining battery life of the client device with which it is communicating, and may continue to transmit data at the fastest possible rate accepted by the mobile device, regardless of the current data transmission needs associated with particular applications operating on the mobile device. Accordingly, battery charge may be quickly depleted while accommodating unnecessarily high data transmission rates. From the client side, it may be inconvenient or unfeasible to manually monitor and configure wireless communication settings associated with the transmission requirements of the presently operating application.

The presently disclosed systems, methods, and apparatus are directed to overcoming and/or mitigating one or more of the possible drawbacks set forth above and/or other problems in the art.

SUMMARY

In some exemplary embodiments of the present disclosure, a mobile computing device is described that may include a processor, and a non-transitory computer-readable memory, including instructions that, when executed, can cause the processor to determine a power level comprising power level information indicative of a battery power level of the mobile computing device, select a power profile from a plurality of power profiles, based on a data transmission type, transmit power profile information representing the selected power profile to an operatively connected second computing device, where the power profile information can be used by the second computing device to configure the data transmission type, and receive data according to the data transmission type.

In another exemplary embodiment, a second computing device is described that can include one or more processors, and a non-transitory computer-readable memory including instructions that are executable by the one or more processors to cause the one or more processors to receive a power profile, configure a data transmission type based on the power profile, and transmit data to the mobile computing device according to the data transmission type.

In yet another exemplary embodiment, a non-transitory computer-readable memory is described that may include instructions that are executable by one or more processors to cause the one or more processors to perform a method. The method may include acquiring a power profile indicative of a power level from an operatively connected mobile computing device, configuring a data transmission type based on the power profile, and providing data to the mobile computing device according to the data transmission type.

In another exemplary embodiment, a computer-implemented method for mobile device power management is described, including determining, via a processor on a mobile computing device, power level information of the mobile computing device, selecting a power profile from a plurality of power profiles, based on a data transmission type, transmitting power profile information representing the selected power profile to an operatively connected second computing device, where the power-profile information can be used by the second computing device to configure the data transmission type, and receiving data according to the data transmission type.

According to another exemplary embodiment, a non-transitory computer-readable memory is described. The computer-readable memory may include instructions thereupon that are executable by one or more processors to cause the one or more processors to perform a method. The method may include determining a power level comprising power level information indicative of a battery power level of the mobile computing device, selecting a power profile from a plurality of power profiles, based on a data transmission type, providing power profile information representing the selected power profile to an operatively connected second computing device, where the power-profile information is used by the second computing device to configure the data transmission type, and acquiring data according to the data transmission type.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Illustrative embodiments of the present disclosure are listed below.

When mobile devices communicate via wireless communication, a large portion of battery power may be consumed by establishing and maintaining the data communication connection with a remote server. According to some estimates, wireless data communication may represent between 40%-50% of energy consumption in a mobile device with an active display, and roughly 70% of energy consumption when the mobile device is operational with the display inactive. As compared to a device with an inactive transceiver (for example, WiFi and/or cellular data is switched off or disabled), some mobile devices are estimated to consume 15 times less power than when sending and receiving data through a WiFi connection. For cellular data transfer, the difference in power consumption may be 100 times greater, or more, as compared with an idle (non-transmitting) state. Although power consumption estimates vary from device to device, the current trend of mobile devices demonstrates significantly higher power consumption in the transmission/reception phase of wireless communication.

A server in active communication with an operatively connected mobile device may typically send and receive data at the highest possible transmission rate that both the mobile device and the server can accommodate. Sending and receiving data at a higher transmission rate than is necessary for the particular application and/or data transmission may unnecessarily drain energy resources on the client device (e.g., a mobile computing device). While a battery has a full charge, a client device can "afford" to spend energy at a higher rate. When the battery level drops significantly, however, the data transmission cycle may consume a larger proportion of the remaining battery with respect to time.

The server side is typically unaware of the remaining battery level/power profile being used by the client device with which it is communicating. The server may attempt to send data (for example, screen updates in a graphically intensive program) as at the next earliest opportunity, unless this flow of data is throttled by some form of flow control requested by the client side. Accordingly, battery charge may be quickly depleted while accommodating unnecessarily high data transmission rates. For example, if the application operating on the client-side mobile computing device changes to an operational state requiring a reduced data transmission rate (for example, displaying primarily text), the server side may continue to send and receive data at the fastest possible rate, when a reduced rate would be sufficient. Moreover, as the battery level decreases, the server side is unaware of an optimized data transmission rate with respect to the needs of the client-side application, client side power consumption rates, and other characteristics of the mobile computing device that may change with respect to time.

Figure 1:
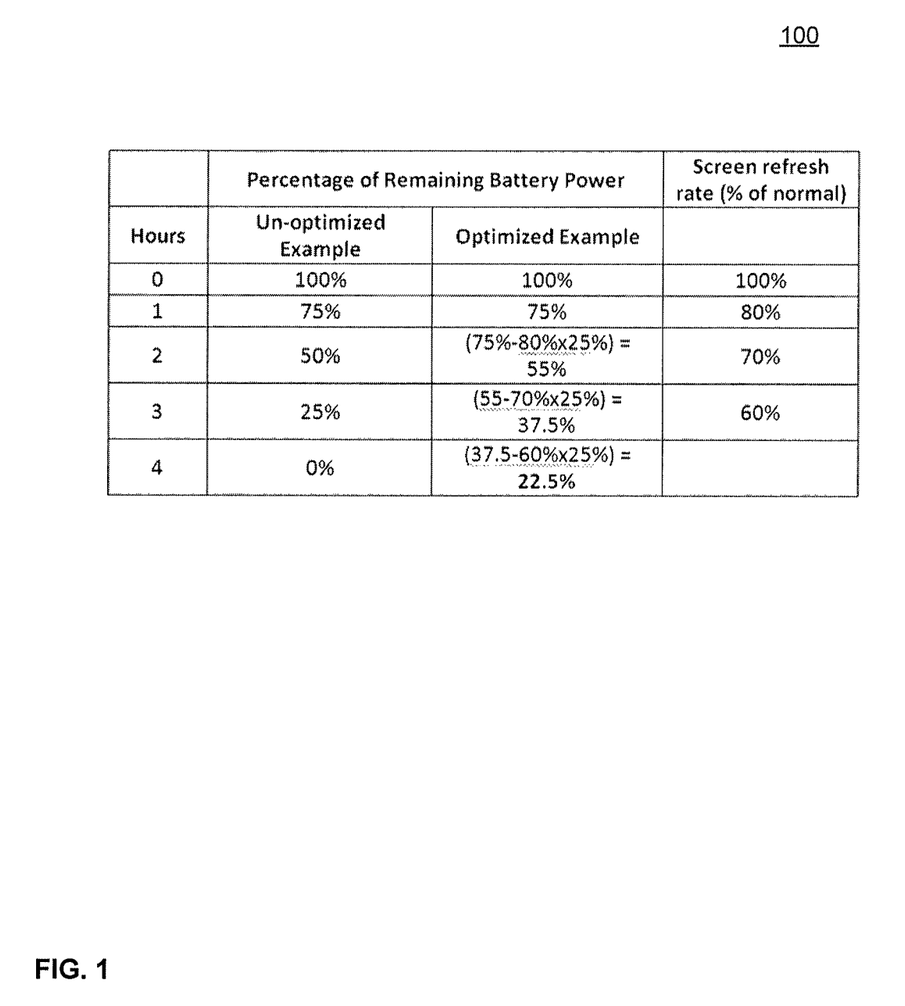
FIG. 1 is a table depicting an exemplary result of implementing embodiments consistent with the present disclosure.

FIG. 1 depicts an exemplary result of implementing embodiments consistent with the present disclosure. In the example depicted in FIG. 1, an unoptimized mobile computing device in active communication with an operatively connected data server may deplete power in a period of time consistent with normal operation of the mobile device, and the limitations of the power supply (e.g., the battery). For example, a mobile device may start at hour "0" with a full battery charge, but after one hour of use, the "unoptimized" device can deplete approximately 25% of the battery power. In hour 2, an additional 25% of the battery can be consumed, etc., until the battery is fully depleted at hour 4. By comparison, an "Optimized Example" is shown in FIG. 1. For example, the first (un-optimized example) device can lose 25% of battery charge every hour. In the "optimized example", when the battery level decreases after the first hour, the client (e.g., the mobile computing device) and server can negotiate a lower screen refresh rate (shown as 80% of the "normal" screen refresh rate). The practical effect of the reduced screen refresh rate can result in reducing the time for which the transceiver on the mobile computing device is actively receiving data. Accordingly, over time, the "optimized" mobile computing device can consume less power. With the assumption that x % screen refresh rate causes the power consumed to be x % of the normal case, the remaining battery level can be computed at the end of each hour. For example, at the end of hour 1 (shown as hour 2 in FIG. 1), the remaining 75% of the battery has been reduced by the "optimized" power consumption rate, due to the 25% reduction of screen refresh rate. Carrying through this same exemplary calculation through the remaining three hours of use under "unoptimized conditions", the example depicted in FIG. 1 illustrates how the "optimized" device can retain 22.5% charge at the end of the 4th hour of use, when the "unoptimized" device has completely discharged. FIG. 1 is meant to illustrate an exemplary benefit according to some embodiments of the present disclosure. It is understood that consumption rates vary according to the particular mobile device, data transmission method, and other aspects. The calculations represented in FIG. 1 are exemplary only, and are not meant to limit the embodiments described herein.

Exemplary embodiments of the present disclosure are described that can provide methods, system, and apparatus for enhancing the battery life on a mobile computing device using wireless communication.

Figure 2:
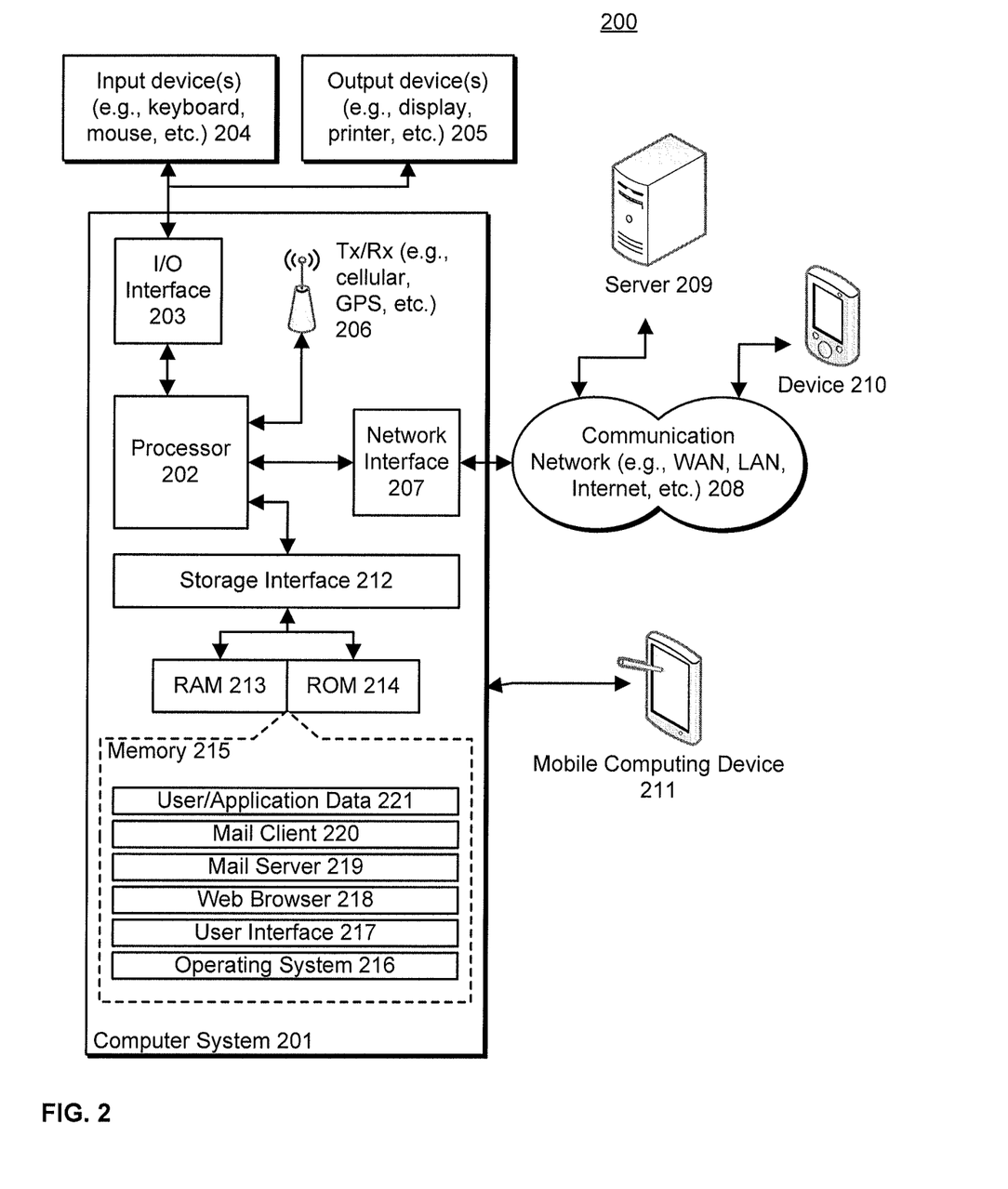
FIG. 2 is a block diagram of an exemplary computer system for implementing embodiments consistent with the present disclosure.

FIG. 2 is a block diagram of an exemplary computer system for implementing embodiments consistent with the present disclosure. Variations of computer system 201 may be used for implementing a server, a mobile computing device, and/or other computing devices. For example, as used herein, mobile computing device 211 may be implemented via computer system 201. Computer system 201 may comprise a central processing unit ("CPU" or "processor") 202. Processor 202 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as an AMD Athlon, Duron or Opteron, ARM's application, embedded or secure processors, IBM PowerPC, Intel's Core, Itanium, Xeon, Celeron or other line of processors, etc. The processor 202 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 202 may be disposed in communication with one or more input/output (I/O) devices via I/O interface 203. The I/O interface 203 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, WiFi, cellular (e.g., code-division multiple access (CDMA), high-speed packet access (HSPA+), global system for mobile communications (GSM), long-term evolution (LTE), WiMax, and/or the like), etc.

Using I/O interface 203, computer system 201 may communicate with one or more I/O devices. For example, input device 204 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 205 may be a printer, fax machine, video display (e.g., cathode ray tube (CRT), liquid crystal display (LCD), light-emitting diode (LED), plasma, or the like), audio speaker, etc. In some embodiments, a transceiver 206 may be disposed in connection with processor 202. Transceiver 206 may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 202 may be disposed in communication with a communication network 208 via a network interface 207. The network interface 207 may communicate with the communication network 208. Network interface 207 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 208 may include, without limitation, a direct interconnection, local area network (LAN), wide area network (WAN) (e.g., 802.11, T1, T3, 56 kb, X.25), wireless network (e.g., using Wireless Application Protocol), the Internet, etc. Using network interface 207 and communication network 208, computer system 201, server 209, and/or another operatively connected computing device may communicate with other computing devices such as, for example, server 209, and/or other mobile computing devices (e.g., device 210). These devices may include, without limitation, personal computer(s), server(s), fax machines, printers, scanners, various mobile devices such as cellular telephones, smartphones (e.g., Apple iPhone™, Blackberry™, Android-based phones, etc.), tablet computers, eBook readers (Amazon Kindle™, Fire™, Nook™, etc.), laptop computers, smartwatches, notebooks, gaming consoles (Microsoft Xbox™, Nintendo DS™, Sony PlayStation™, etc.), or the like. In some embodiments, computer system 201 may itself embody one or more of these devices.

In some embodiments, processor 202 may be disposed in communication with one or more memory devices (e.g., RAM 213, ROM 214, etc. (collectively known as memory devices 215)) via a storage interface 212. Storage interface 212 may connect to memory devices 215 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, one or more databases operatively connected to computer system 201.

Memory devices 215 can include a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), a cache, a register, or a semiconductor memory. Memory devices 215 may store a collection of program or database components, including, without limitation, operating system 216, user interface application 217, web browser 218, mail server 219, mail client 220, user/application data 221 (e.g., any data variables or data records discussed in this disclosure), etc. Operating system 216 may facilitate resource management and operation of computer system 201. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 217 may facilitate display, execution, interaction, manipulation, or operation of program components through textual or graphical facilities. For example, user interfaces may provide computer interaction interface elements on a display system operatively connected to computer system 201, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 201 may implement a web browser 218 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 201 may implement a mail server 219 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 201 may implement a mail client 220 stored program component. The mail client may be a mail viewing application, such as Apple Mail, Microsoft Entourage, Microsoft Outlook, Mozilla Thunderbird, etc.

In some embodiments, computer system 201 may store user/application data 221, such as the data, variables, records, etc., as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

In exemplary embodiments, computer system 201 may include a power supply unit (not shown) such as, for example, a battery or other power source. Accordingly, processor 202 may determine a characteristic of the battery and/or power source, such as, for example, a battery power level, a rate or power consumption, and/or other characteristics in connection with determining a power consumption rate.

Figure 3:
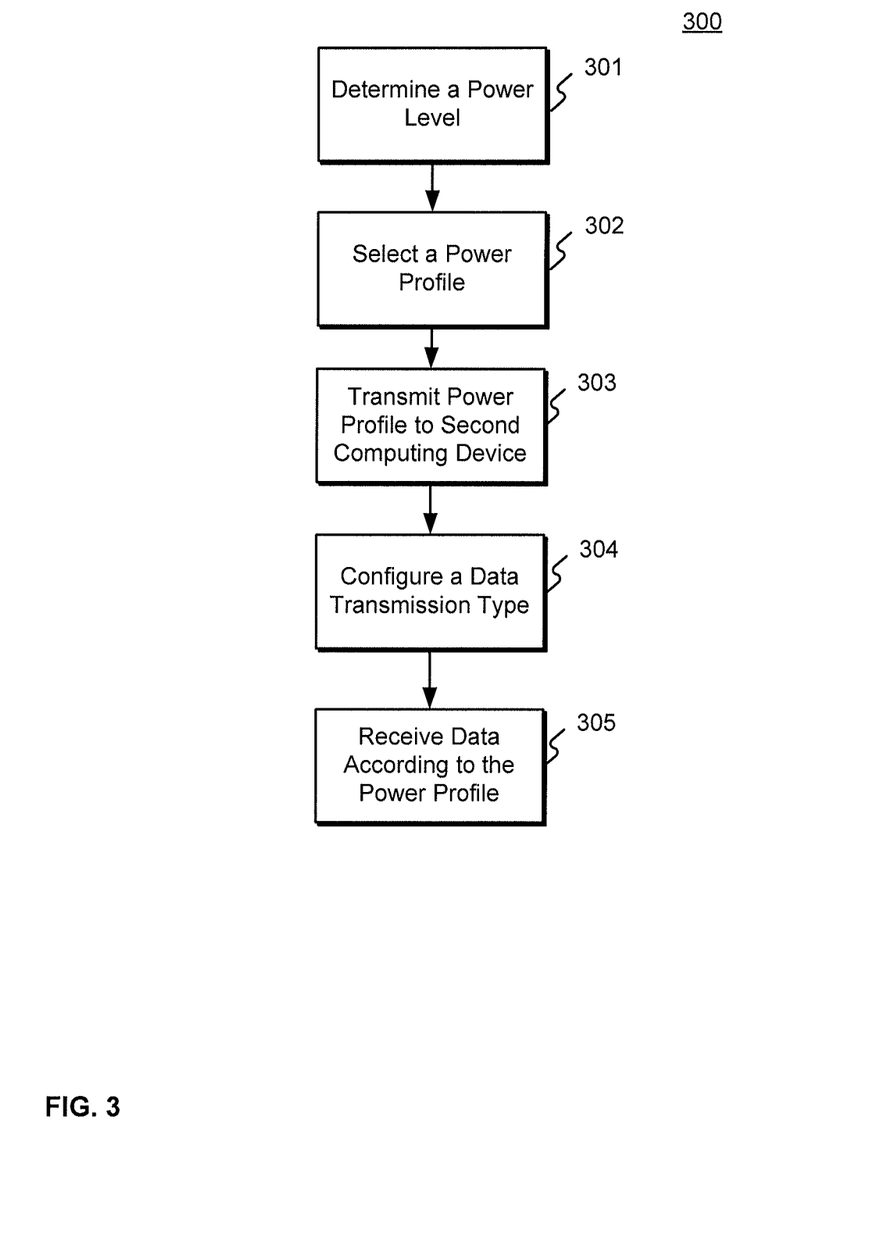
FIG. 3 is a flow diagram illustrating an exemplary method mobile device power management, in accordance with some embodiments of the present disclosure.
Figure 4:
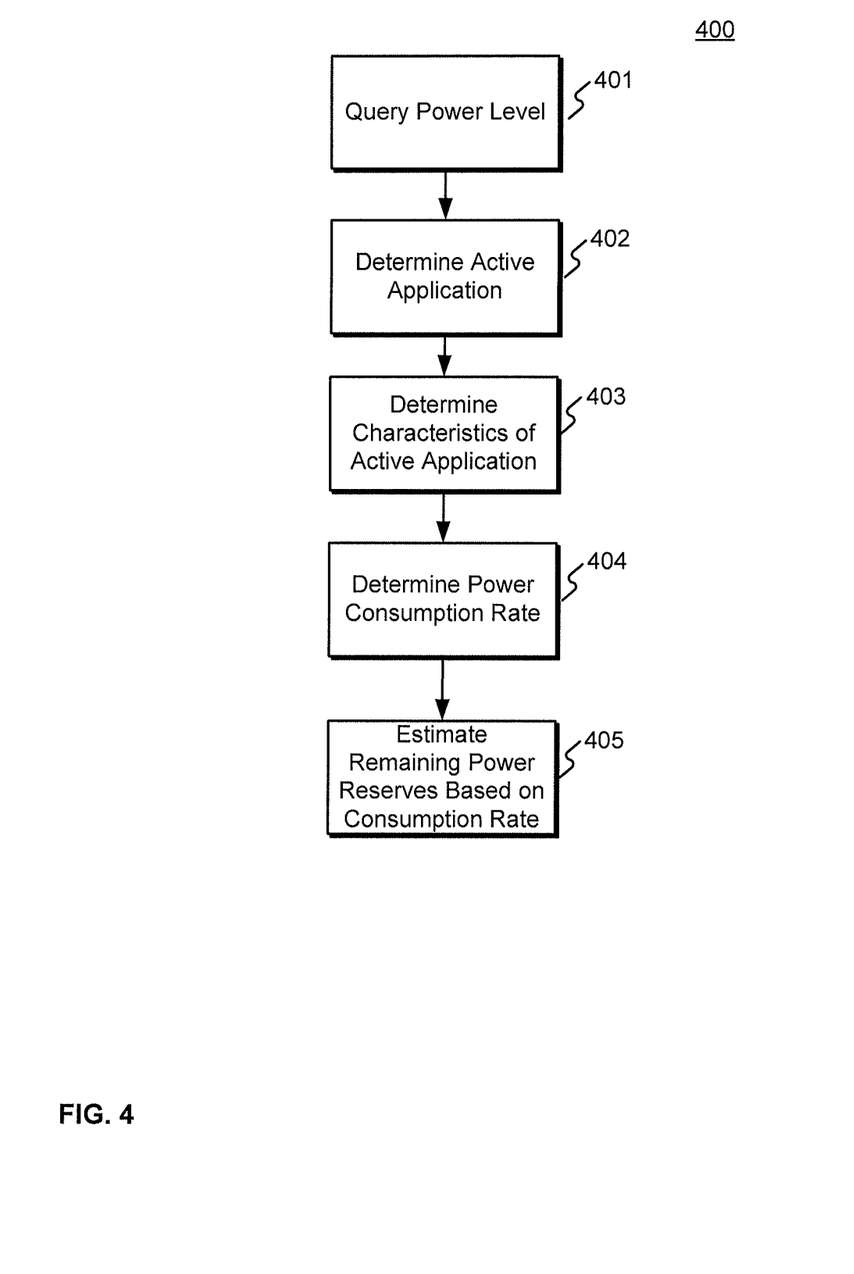
FIG. 4 is a flow diagram illustrating an exemplary method for determining a power level, in accordance with some embodiments of the present disclosure.

FIG. 3 depicts a method for mobile device power management 300, consistent with exemplary embodiments of the present disclosure. As shown in FIG. 3, method 300 may be performed by mobile computing device 211, which may be operatively connected to another computing device, for example, server 209. Hereafter, mobile computing device 211 may be identified as a "client" or "client device", and the one or more computers with which mobile computing device 211 communicates via wireless communication may be identified as a "server" or "server 209". Referring now to FIG. 3, mobile computing device 211 may commence by determining a power level (step 301). FIG. 4 depicts an exemplary method for determining a power level.

Referring now to FIG. 4, processor 202 may query a power level (step 401) of one or more battery supplies (not shown) operatively connected to and powering mobile computing device 211. For example, processor 202 may determine, by querying operating system 216, application data 221, and/or other by other means, a power level that includes power level information indicative of a battery power level of mobile computing device 211.

After determining the current power level, processor 202 may determine which application(s) are running on mobile computing device (step 402). A particular application may be associated with one or more operational characteristics associated with running the application. The operational characteristics may include a data transmission type used by mobile computing device 211 to send and/or receive data used by the application. A data transmission type, as used herein, may describe a category of data transmission with one or more identifying characteristics associated with that the transmission. For example, if mobile computing device 211 is running a live video chat program (e.g., a "chat" client), certain operational characteristics may be associated with the application, such as, for example, a screen refresh rate requirement of 3× Hz, and a data transmission rate requirement of 2× Mbps. These exemplary rates may be associated with a data transmission type of "video chat". In another aspect, by comparison, a text messaging client application may be associated with a data transmission type of "text chat", which may require data transmission rate of 0.2× and 0.2 Mbps for proper functionality. In this example, the data transmission rate for the type "video chat" may be greater than the rate associated with type "text chat".

Accordingly, processor 202 may determine one or more active applications on mobile computing device 211 as part of the power level determination (step 401), and determine one or more characteristics of the active application (step 403). Operational characteristics of a data transmission type may include, for example, data transmission rate, video refresh rate, one or more processing costs, etc. Though not explicitly listed, it should be understood that there are numerous data transmission types associated with known types of applications. The data transmission types described herein and their particular nomenclature are exemplary only, and are not meant to be an exclusive list.

Processor 202 may determine the power consumption rate of mobile computing device 211 (step 404) using the battery power level and data transmission type associated with the applications contemporaneously running on mobile computing device 211. With the power consumption rate determined, processor 202 may estimate the remaining power reserves using the consumption rate and other determined characteristics (step 405). For example, processor 202 may estimate the operational time remaining with respect to the current level of power and current rate of consumption. After determining and analyzing power level data as described above with respect to method 400, processor 202 may now select a power profile.

Referring again to FIG. 3, processor 202 may select a power profile (step 302) using power level data of mobile computing device 211. According to some embodiments, mobile computing device 211 may include a plurality of sets of data including one or more plurality of power profiles saved in memory 215. The power profiles may be saved as part of one or more of operating system 216, user interface 217, and/or user application data 221. Each of the plurality of power profiles may represent a plurality of operational characteristics associated with a particular client application type, and/or data transmission type.

As used herein, a power profile may include data that includes power usage values associated with one or more particular transmission types. The power profile may be associated with one or more known operational characteristics in connection with a particular application and/or data transmission requirement. For example, the power consumption of a component of mobile computing device 211 may be determined in units of milliamps (mA) of current draw (at nominal voltage) in the power profile. The power profile may associate a particular current draw of 3× mA for data transmission types of "video chat". The attribute cost of keeping a display on for a duration of time at a particular brightness level and with a particular refresh rate may also be attributed to a power profile. As another example, a power profile may include the power consumption in mA required to operate transceiver 206 at 4× Mbps, for transmission of video data at a particular quality (e.g., 1080 p). Operation of transceiver 206 at 4× Mbps may be associated with a data transmission type of "text chat".

Power profiles may be defined to associate a particular remaining battery level of the device to the rates at which the server is sending (or expecting) updates. According to some exemplary embodiments, mobile computing device 211 may manage power with power profiles.

Figure 5:
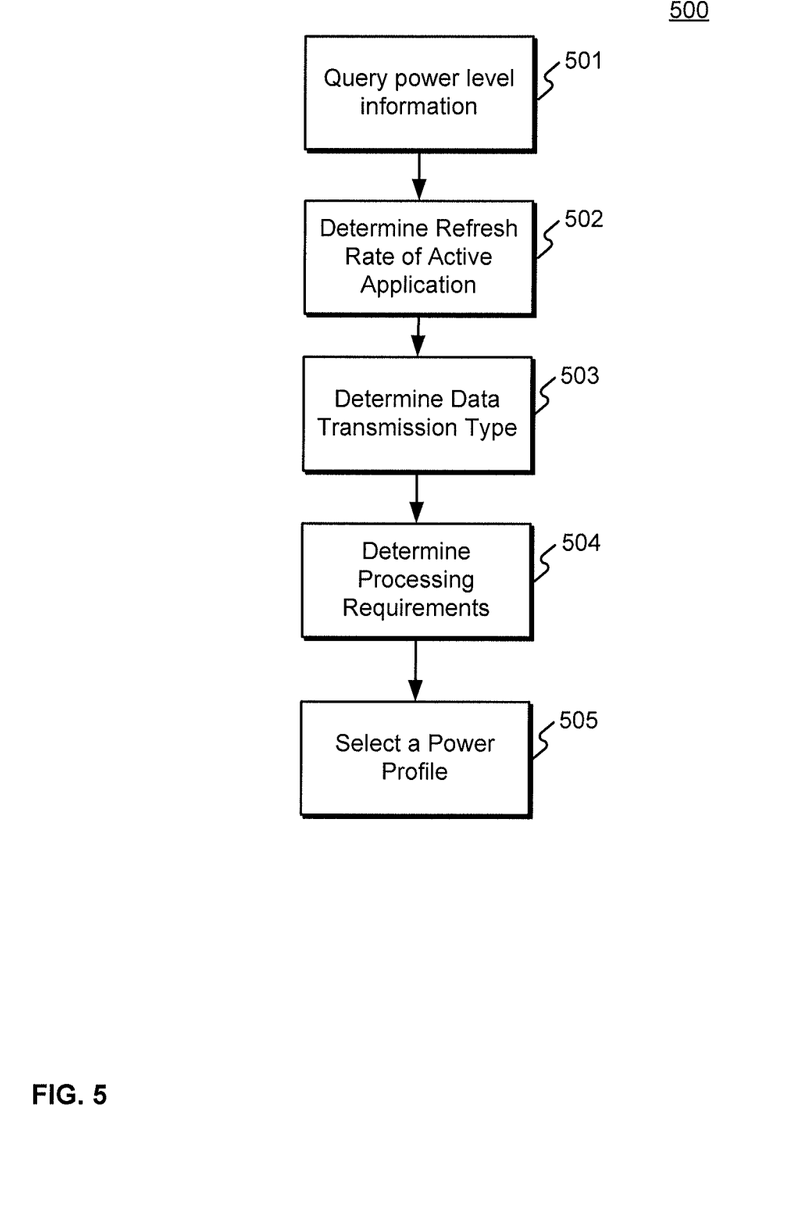
FIG. 5 is a flow diagram illustrating an exemplary method of selecting a power profile, in accordance with some embodiments of the present disclosure.

In some aspects, processor 202 may select a power profile based on the actual power usage. For example, when the battery level of the client device is 100%, it can afford to spend energy at a high rate, and the profile may indicate that the client and server exchange data at the highest possible rate. When the client battery level drops to 75%, the client device (e.g., mobile computing device 211) may communicate information indicating the power level to the server (e.g., server 209), and the transmitting server, using a different power profile, may decrease the rate of data transmission to the client to 90% of the maximum rate. When the battery level drops to 50%, processor 202 may select another power profile setting the data transmission rate to 80% of the maximum rate, and so on. Processor 202 may select a power profile using the power level information as previously discussed with respect to FIG. 4. Processor 202 may select a power profile based on various operational characteristics of mobile computing device 211. FIG. 5 describes an exemplary method of selecting a power profile.

Referring now to FIG. 5, an exemplary method of selecting a power profile is described according to embodiments disclosed herein. In some aspects, processor 202 may again query power level information (step 501) from one or more systems of mobile computing device 211. Processor 202 may also determine one or more applications currently executing on mobile computing device 211, and determine a refresh rate of one or more active applications (step 502). Processor 202 may also determine characteristics of the one or more active applications, such as, for example, the data transmission type (step 503) associated with (and/or utilized by) the one or more active applications, and determine the processing requirements (step 504) associated with the transmission type and/or the one or more active applications.

For example, processor 202 may determine that a particular power profile "Y" is optimal for transmission type "video chat", in view of a particular battery power level (for example, 95%). As another example, processor 202 may determine that a particular power profile of "Z" is optimal for transmission type "video chat", in view of a reduced batter power level of 70%. Processor 202 may select the power profile based on power level information.

Accordingly, a particular power profile may be selected based on, at least in part, a refresh rate of an output screen of mobile computing device 211. In some aspects, the rate of power consumption may be increased after transceiver 206 is configured to receive data at a relatively high data transmission rate, and decreased when transceiver 206 is configured to receive data at a relatively low transmission rate. Processor 202 may determine that a particular transmission type (e.g., "video chat") has particular refresh rate requirements. Accordingly, processor 202 may use refresh rate in selecting a power profile.

Power consumption rate may change with a particular application type, the type of media displayed by that application, and the type of data transmission required by the particular application. Thus, processor 202 may also select the power profile based on the data transmission type.

Processor 202 may also determine the processing requirements (step 504) of mobile computing device 211. Processor 202 may determine the power profile based on one or more processing requirements associated with an application operating on the mobile computing device. For example, processor 202 may select a particular power profile because a particular application is active that may be known to require a high level of processing power, and thus, draw more battery power. In some aspects, a particular application may be known to require little processing power, and thus, may be optimal at another power profile. After considering various operational aspects of mobile computing device 211, processor 202 may select a power profile (step 505).

Referring again to FIG. 3, after determining an optimal power profile and selecting the profile (step 505), processor 202 may transmit the power profile to a second computing device (step 303) with which data is being communicated. For example, mobile computing device 211 may transmit the power profile to server 209. Server 209 may consider the power profile, transmit an acknowledgement to mobile computing device 211, and configure a data transmission type (step 304) according to the power profile. Accordingly, server 209 may then transmit the optimized data transmission accordingly.

In some embodiments, processor 202 may determine the power level, select the power profile (step 302), and transmit the selected power profile at a predetermined time intervals. For example, processor 202 may select a power profile every 60 seconds, and transmit the request to server 209 (step 303), based on a predetermined threshold of energy consumption of the mobile computing device 211. According to another aspect, if the energy consumption rate is increased, processor 202 may determine a new power profile at a shorter time interval, e.g., every 15 seconds.

According to yet another aspect, processor 202 may determine the time interval based on the power level. For example, processor 202 may determine a power profile at a different time interval after the battery power reaches a particular trigger point (e.g., at 50%, 40%, 35%, 20%, etc.).

Figure 6:
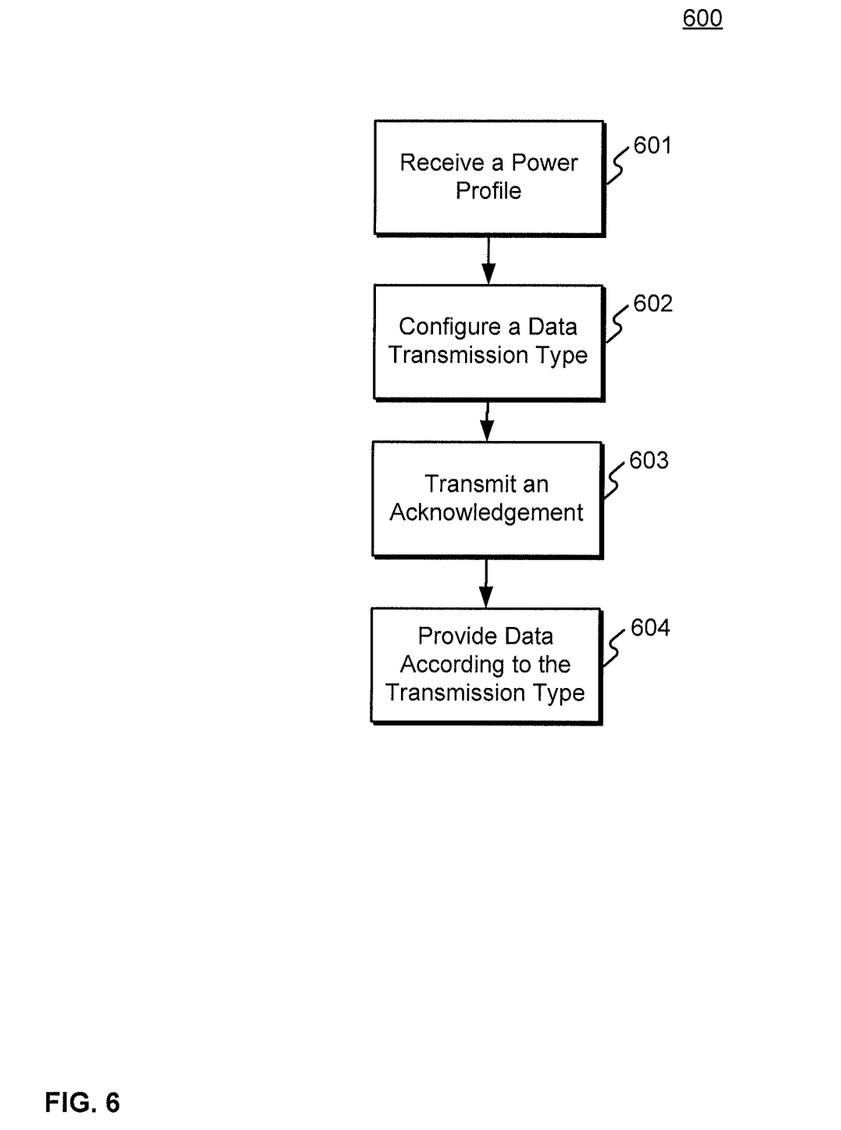
FIG. 6 is a flow diagram illustrating an exemplary method of configuring a data transmission type responsive to receiving a power profile, in accordance with some embodiments of the present disclosure.

FIG. 6 depicts an exemplary method of configuring a data transmission type responsive to receiving a power profile, in accordance with some embodiments of the present disclosure. From the perspective of a server (e.g., server 209) operatively connected to and in communication with a mobile computing device (e.g., mobile computing device 211), server 209 may receive a power profile (step 601) from mobile computing device 211. Responsive to receiving the power profile, server 209 may configure a data transmission type according to the power profile (step 602). Server 209 may configure the data transmission type based on any one or more of a plurality of characteristics, including but not limited to a software type, a data type, available bandwidth in the connection with mobile computing device 211, and/or one or more hardware characteristics in connection with server 209. Server 209 may then transmit an acknowledgement to mobile computing device 211 (step 603), and provide data according to the transmission type (step 604).

According to another embodiment, server 209 may receive power level information indicative of an operatively connected mobile computing device (e.g., mobile computing device 211), and select a power profile according to the power level information. In one some aspects, server 209 may transmit an acknowledgment including the selected power profile to mobile computing device 211.

The specification has described methods, systems and devices for mobile device power management. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising", "having", "containing", and "including", and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an", and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium (e.g., memory 215) may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media, a cache, a register, or a semiconductor memory.

It is intended that the disclosure and examples be considered as exemplary only, with a true scope and spirit of disclosed embodiments being indicated by the following claims.

What is claimed is:

1. A mobile computing device comprising:
   a processor, and
   a non-transitory computer-readable memory, comprising instructions that, when executed, cause the processor to:
   determine which one or more applications are running on the mobile computing device and a data transmission type of an application of the one or more applications;
   determine a power level of the mobile computing device comprising power level information indicative of a battery power level of the mobile computing device;
   determine a power consumption rate using the power level and the data transmission type;
   select a power profile from a plurality of power profiles, based at least on a data transmission type of the application of the one the or more applications of the mobile computing device, the power consumption rate and the power level of the mobile computing device, wherein the data transmission type identifies a category of data corresponding to the application;
   transmit power profile information representing the selected power profile to an operatively connected second computing device, wherein the power profile information is used by the second computing device to select a second power profile for the second computing device to transmit data to the mobile computing device;
   receive data from the second computing device transmitted according to a second data transmission type of the selected second power profile of the second computing device; and
   wherein determining the power level, selecting the power profile, and transmitting power profile information representing the selected power profile occur at a predetermined time interval based on the power level of the mobile computing device.

2. The mobile computing device of claim 1, wherein the selected second power profile of the second computing device is different from the selected power profile of the mobile computing device.

3. The mobile computing device of claim 1, wherein the power profile is selected based on the power level, the data transmission type and a refresh rate of an output screen of the mobile computing device and whether the application is active.

4. The mobile computing device of claim 1, wherein the power profile is selected based on the type of data transmission type identifying the category of data associated with a type of information displayed on an output screen of the mobile computing device.

5. The mobile computing device of claim 1, wherein the power profile is selected based on user interface information of a user interface contemporaneously operating on the mobile computing device.

6. The mobile computing device of claim 1, wherein the power profile is selected based on one or more processing requirements associated with an application operating on the mobile computing device and wherein the power profile is associated with a particular remaining battery level of the mobile computing device for rates which the second computing device is sending updates.

7. The mobile computing device of claim 1, wherein determining the power level, selecting the power profile, and transmitting power profile information representing the selected power profile occur at a predetermined time interval.

8. The mobile computing device of claim 1, wherein the data transmission type comprises one of video chat or text chat.

9. The mobile computing device of claim 7, wherein a time duration of the predetermined time interval is based on the power level.

10. A second computing device comprising:
    one or more processors; and
    a non-transitory computer-readable memory, comprising instructions that are executable by the one or more processors to cause the one or more processors to:
    receive a power profile from a mobile computing device;
    configure a second power profile of the second computing device based on the power profile of the mobile computing device, wherein the second power profile comprises a data transmission type that identifies a category of data corresponding to an application of the mobile computing device;
    transmit data to the mobile computing device according to a second data transmission type of the second power profile of the second computing device; and
    wherein receiving the power profile, configuring the data transmission type, and transmitting the data occur at a predetermined time interval based on a predetermined threshold of energy consumption of the mobile computing device.

11. The second computing device of claim 10, wherein the power profile comprises power level information, and is selected based on the power level information.

12. The second computing device of claim 10, wherein the power profile comprises a refresh rate of an output screen of the mobile computing device, and is selected based on the refresh rate.

13. The second computing device of claim 10, wherein the power profile comprises the data transmission type identifies the category of data associated with a type of information displayed on an output screen of the mobile computing device, and is selected based on the data transmission type.

14. The second computing device of claim 10, wherein the power profile comprises user interface information of a user interface contemporaneously operating on the mobile computing device, and is selected based on the user interface.

15. The second computing device of claim 10, wherein the power profile comprises one or more processing requirements associated with an application operating on the mobile computing device, and is selected based on the one or more processing requirements.

16. The second computing device of claim 10, wherein receiving the power profile, configuring the data transmission type, and transmitting the data occur at a predetermined time interval.

17. The second computing device of claim 10, wherein the data transmission type comprises of a video chat or a text chat.

18. The second computing device of claim 16, wherein a time duration of the predetermined time interval is based on the data transmission type.

19. A non-transitory computer-readable memory comprising instructions that are executable by one or more processors to cause the one or more processors to perform a method, the method comprising:
    acquiring a power profile indicative of a power level from an operatively connected mobile computing device, wherein the power profile was selected based at least on a data transmission type of an application of the one the or more applications of the mobile computing device, the power consumption rate and the power level of the mobile computing device; configuring a second power profile of the second computing device based on the power profile of the mobile computing device, wherein the second power profile specifies a data transmission type that identifies a category of data corresponding to the application of the mobile computing device;
    providing data to the mobile computing device according to a second data transmission type of the second power profile of the second computing device;
    wherein acquiring the power profile, configuring the data transmission type, and providing the data to the mobile computing device occur at a predetermined time interval based on a predetermined threshold of energy consumption of the mobile computing device.

20. The non-transitory computer-readable memory of claim 19, wherein the second power profile of the second computing device is different from the power profile of the mobile computing device.

21. The non-transitory computer-readable memory of claim 19, wherein the power profile comprises a refresh rate.

22. The non-transitory computer-readable memory of claim 19, wherein the power profile comprises the data transmission type identifying the category of data associated with a type of information displayed on an output screen.

23. The non-transitory computer-readable memory of claim 19, wherein the power profile comprises user interface information of a user interface.

24. The non-transitory computer-readable memory of claim 19, wherein the power profile comprises one or more processing requirements associated with an application operating on the mobile computing device.

25. The non-transitory computer-readable memory of claim 19, wherein acquiring the power profile, configuring the data transmission type, and providing the data to the mobile computing device occur at the predetermined time interval that increases as energy consumption of the mobile computing device decreases.

26. The non-transitory computer-readable memory of claim 25, wherein the predetermined time interval is variable.

27. The non-transitory computer-readable memory of claim 26, wherein a time duration of the predetermined time interval is based on the power level.

28. A computer-implemented method for mobile device power management, comprising:
    determining, via a processor on a mobile computing device, which one or more applications are running on the mobile computing device and a data transmission type of an application of the one or more applications;
    determining, via the processor of the mobile computing device, power level information of the mobile computing device;
    determining, via the processor on the mobile computing device, a power consumption rate using the power level of the mobile computing device and the data transmission type;
    selecting a power profile from a plurality of power profiles, based at least on a data transmission type of an application of the one the or more applications of the mobile computing device, the power consumption rate and the power level of the mobile computing device, wherein the data transmission type identifies a category of data corresponding to the application;
    transmitting power profile information representing the selected power profile to an operatively connected second computing device, wherein the power-profile information is used by the second computing device to select a second power profile for the second computing device to transmit data to the mobile computing device; and
    receiving data according to a second data transmission type of the selected second power profile of the second computing device; and
    wherein determining the power level, selecting the power profile, and transmitting power profile information representing the selected power profile occur at a predetermined time interval based on a predetermined threshold of energy consumption of the mobile computing device.

29. The computer-implemented method of claim 28, wherein the power profile is selected based on the data transmission type which identifies the category of data of one of text chat or video chat.

30. The computer-implemented method of claim 28, wherein the power profile comprises a refresh rate of an output screen of the mobile computing device, and is selected based on the refresh rate.

31. The computer-implemented method of claim 28, wherein the power profile comprises the data transmission type identifying the category of data associated with a type of information displayed on an output screen of the mobile computing device, and is selected based on the data transmission type.

32. The computer-implemented method of claim 28, wherein the power profile comprises user interface information of a user interface contemporaneously operating on the mobile computing device, and is selected based on the user interface.

33. The computer-implemented method of claim 28, wherein the power profile comprises one or more processing requirements associated with an application operating on the mobile computing device, and is selected based on the one or more processing requirements.

34. The computer-implemented method of claim 28, wherein the mobile computing device determines the power level information, selects the power profile, and transmits power profile information representing the selected power profile at the predetermined time interval that decreases as energy consumption of the mobile computing device increases.

35. The computer-implemented method of claim 34, wherein the predetermined time interval is variable.

36. The computer-implemented method of claim 35, wherein a duration of the predetermined time interval is based on a percentage of the power level.

37. A non-transitory computer-readable memory comprising instructions that are executable by one or more processors to cause the one or more processors to perform a method, the method comprising:
   determining which one or more applications are running on the mobile computing device and a data transmission type of an application of the one or more applications;
   determining a power level of the mobile computing device comprising power level information indicative of a battery power level of the mobile computing device;
   determining a power consumption rate using the power level and the data transmission type;
   selecting a power profile from a plurality of power profiles, based at least on a data transmission type of the application of the one the or more applications of the mobile computing device, the power consumption rate and the power level of the mobile computing device, wherein the data transmission type identifies a category of data corresponding to the application;
   providing power profile information representing the selected power profile to an operatively connected second computing device, wherein the power-profile information is used by the second computing device to select a second power profile for the second computing device to transmit data to the mobile computing device;
   acquiring data according to a second data transmission type of the selected second power profile of the second computing device; and
   wherein determining the power level, selecting the power profile, and transmitting power profile information representing the selected power profile occur at a predetermined time interval based on a predetermined threshold of energy consumption of the mobile computing device.

38. The non-transitory computer-readable memory of claim 37, wherein the power profile is selected based on the power level information.

39. The non-transitory computer-readable memory of claim 37, wherein the power profile is selected based on a refresh rate of an output screen of the mobile computing device.

40. The non-transitory computer-readable memory of claim 37, wherein the power profile is selected based on the type of data transmission type identifying the category of data associated with a type of information displayed on an output screen of the mobile computing device.

41. The non-transitory computer-readable memory of claim 37, wherein the power profile is selected based on user interface information of a user interface contemporaneously operating on the mobile computing device.

42. The non-transitory computer-readable memory of claim 37, wherein the power profile is selected based on one or more processing requirements associated with an application operating on the mobile computing device.

43. The non-transitory computer-readable memory of claim 37, wherein determining the power level, selecting the power profile, and transmitting power profile information representing the selected power profile occur at a predetermined time interval.

44. The non-transitory computer-readable memory of claim 43, wherein the predetermined time interval is variable.

45. The non-transitory computer-readable memory of claim 44, wherein a time duration of the predetermined time interval is based on a particular trigger point of the power level.

* * * * *